Figure 2:
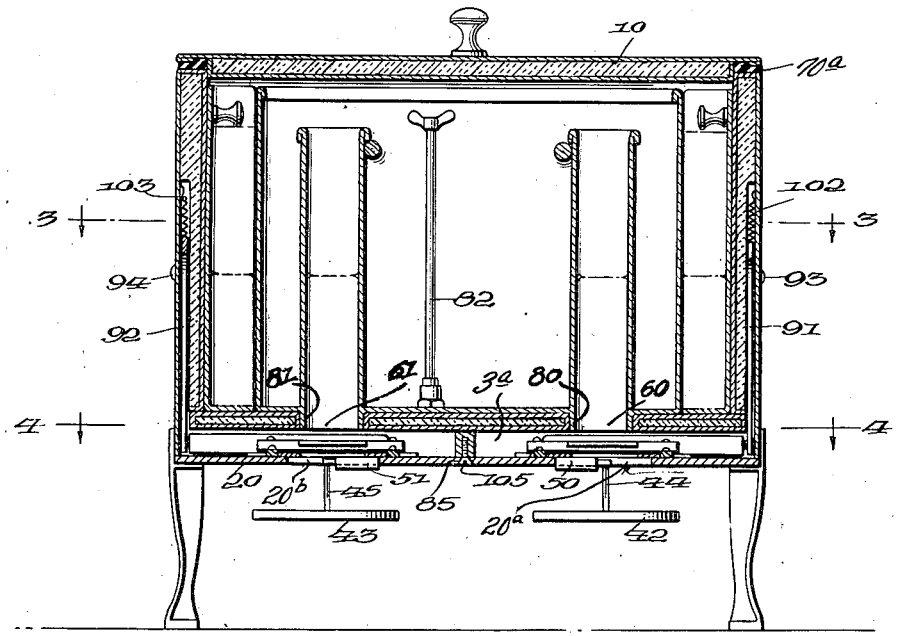

Oct. 26, 1937.　　　　L. H. REZOS　　　　2,097,238
SANITARY BUTTER DISPENSER
Filed July 16, 1935　　　3 Sheets—Sheet 1
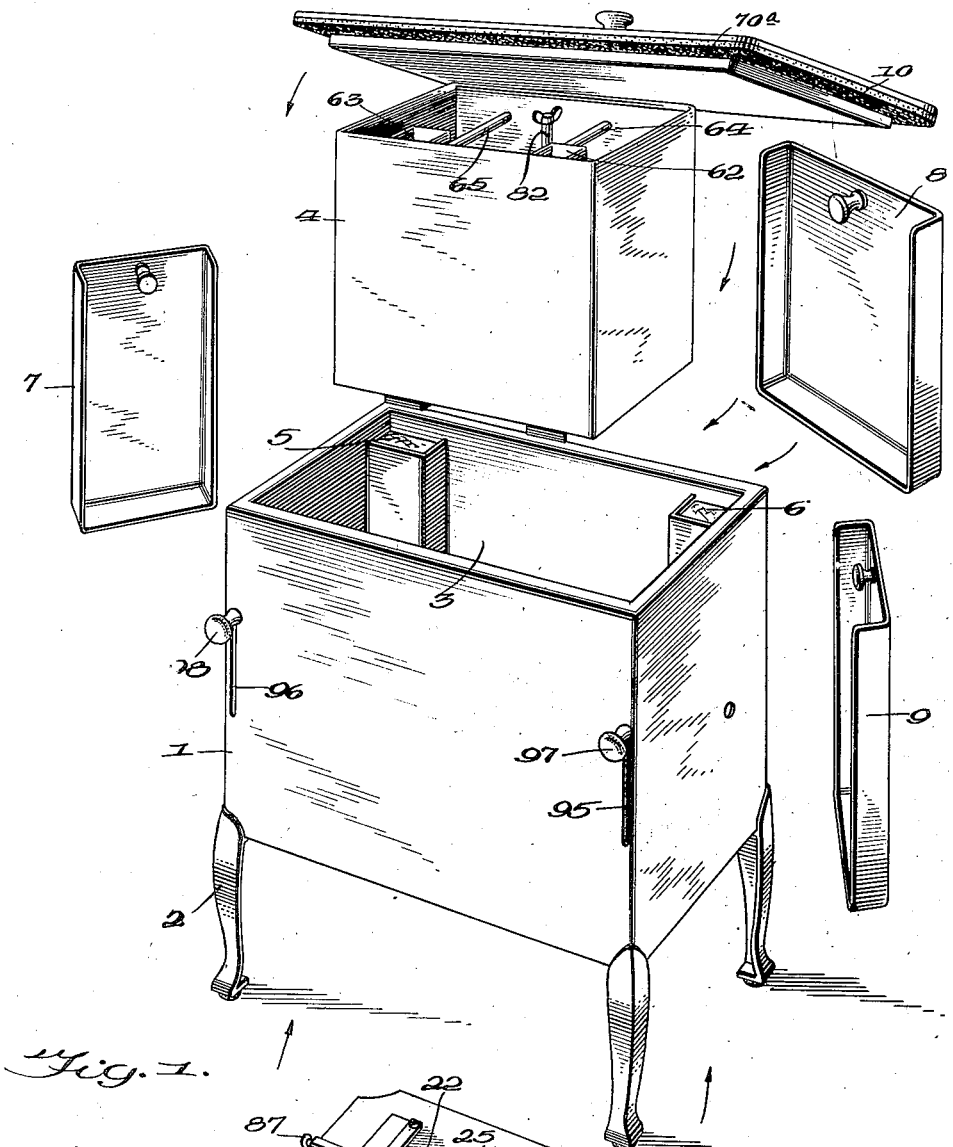
Fig. 1.
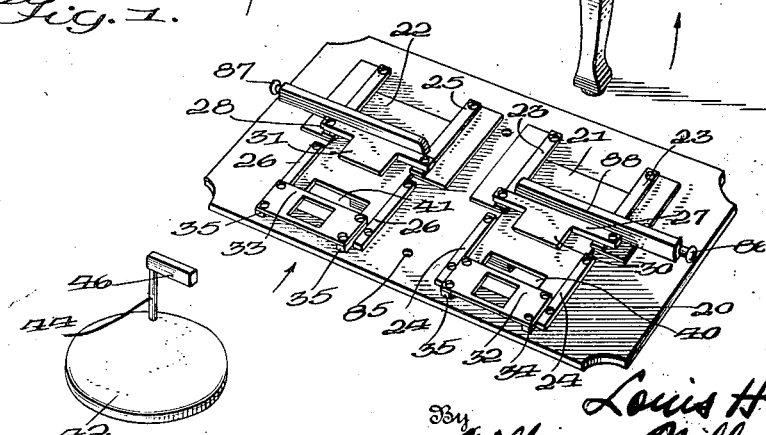
INVENTOR
Louis H. Rezos
By Milburn & Milburn Attorneys Oct. 26, 1937.  L. H. REZOS  2,097,238
SANITARY BUTTER DISPENSER
Filed July 16, 1935   3 Sheets-Sheet 3

Inventor
Louis H. Rezos
By Milburn & Milburn
Attorneys

Patented Oct. 26, 1937

2,097,238

UNITED STATES PATENT OFFICE 2,097,238

SANITARY BUTTER DISPENSER

Louis H. Rezos, Arlington, Va., assignor to Arta Corporation of America, Washington, D. C., a corporation of Delaware Application July 16, 1935, Serial No. 31,715

8 Claims. (Cl. 31—21).

The invention relates to butter dispensers, and particularly to devices of this character in which the butter is disposed above a cutting means.

One of the principal objects of my invention is the provision of a butter dispenser adapted to receive one or more sticks, bars or blocks of butter such as are customarily marketed, for example, in quarter-pounds, and to cut and dispense therefrom single pieces of butter of a size suitable for individual servings.

Another object is the provision of combined cutting and dispensing means of improved form, comprising cooperating cutting blades and dispensing devices.

A further object is the provision of a butter dispenser of cabinet form provided with one or more vertically disposed tubes or holders for the butter to be dispensed, cutting and dispensing means, and storage trays or chambers for a reserve supply of butter, all of the parts being readily detachable and removable to permit cleaning thereof and to provide a sanitary butter dispenser.

Figure 3:
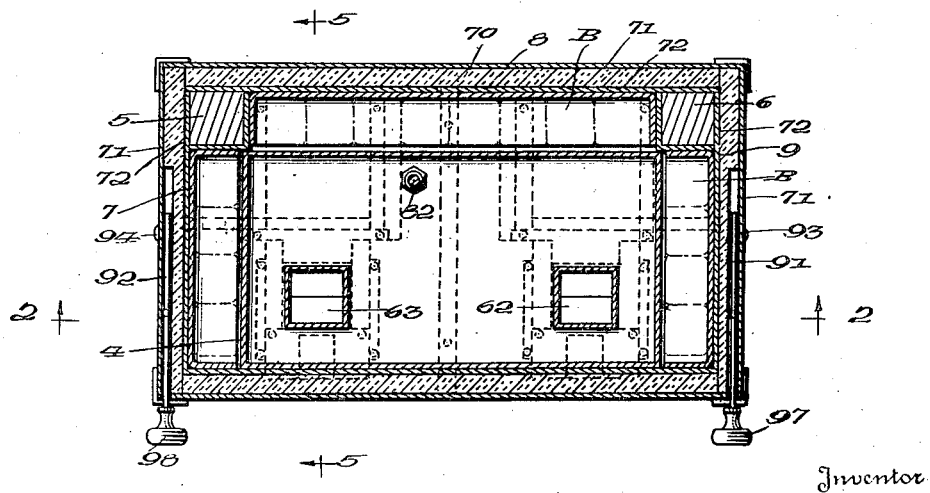
Figure 4:
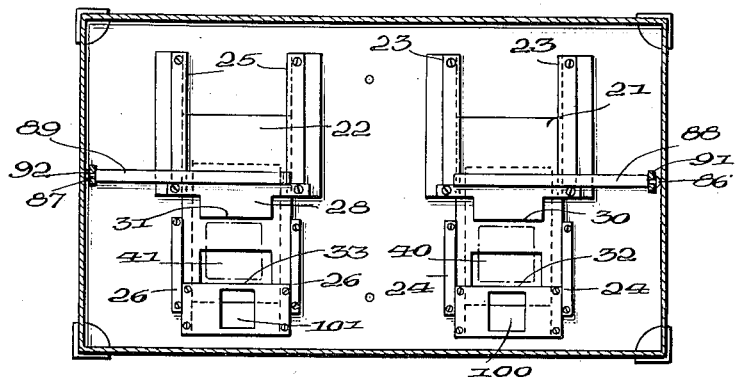
Figures 5, 7:
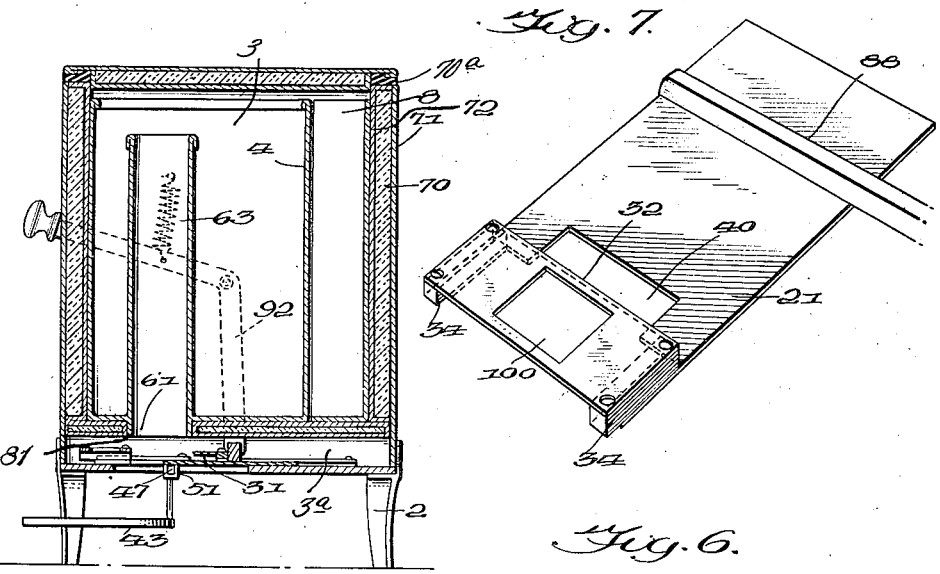
Figure 6:
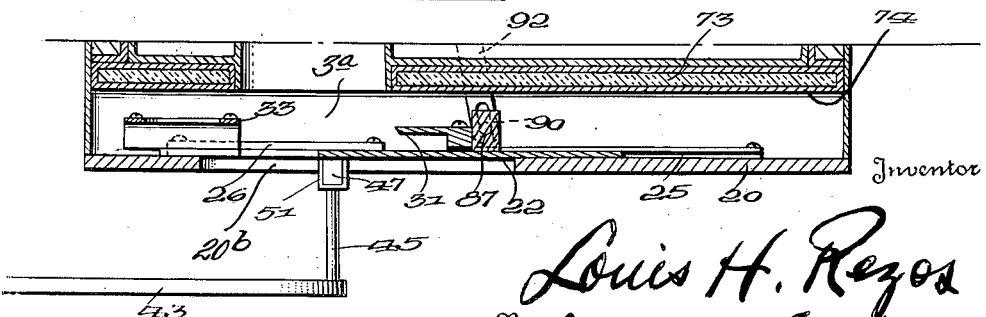

In the drawings, wherein a preferred embodiment of my invention is illustrated,

Figure 1 is a perspective assembly view of the invention showing the several parts removed from the cabinet, Figure 2 is a vertical longitudinal sectional view taken on line 2—2 of Fig. 3, Figure 3 is a horizontal longitudinal sectional view taken on line 3—3 of Fig. 2, Figure 4 is a similar view on line 4—4 of Fig. 2 showing a plan view of the top of the cutting and dispensing plate shown on the bottom of Fig. 1, Figure 5 is a vertical transverse sectional view taken on line 5—5 of Fig. 3, Figure 6 is an enlarged view similar to Fig. 5, showing in detail the cutting and dispensing mechanism illustrated in Fig. 5, and Figure 7 is a perspective view of the cutting and dispensing member illustrated in top plan in Fig. 4 and in section in Figs. 5 and 6.

In the form of the invention illustrated in the drawings, the invention is incorporated in a cabinet 1, preferably supported on legs 2 and provided with a chamber 3 adapted to receive a butter container or holder 4 slidably insertable therein in contact with the front wall of the cabinet and corner posts 5, 6, and trays or receptacles 7, 8, 9, which may be open at one end and one side, as shown in Fig. 1.

A close-fitting cover 10 with a sealing strip 10a of rubber or other suitable material around the edges of its under side, is provided for closing the top of the chamber 3, the bottom of the chamber being closed by a suitably apertured wall beneath which is cooperatively disposed a removable plate 20 secured to the bottom 74 of the cabinet by screws 105 in countersunk holes 85 in the plate. Upon plate 20 are mounted cutting and dispensing slides 21, 22, slidably positioned between opposed pairs of guides 23, 24, and 25, 26, respectively, the guides being fixedly secured to plate 20.

The slides 21, 22, operate in a plane between the plate 20 and bars 27, 28, respectively, the bars being secured to the guides 23, 25, respectively, and fitting closely against the slides 21, 22. The bars 27, 28, are provided with blades or knives 30, 31, which cooperate with transverse blades or knives 32, 33, respectively, on the slides 21, 22.

The blades 32, 33, are offset from slides 21, 22, by strips 34, 35, to an extent sufficient to permit these blades to fit closely over the blades 30, 31, respectively, when the slides 21, 22, are reciprocated to bring the blades 32, 30, and 33, 31, into cooperating relation.

The slides 21, 22, are provided with apertures 40, 41, respectively, adapted to register with apertures 20a, 20b, respectively, in plate 20 to permit the pieces of butter, when cut by the cooperating blades, to fall through the slide or slides by gravity upon trays or receptacles 42, 43, detachably secured to the slides 21, 22, respectively, and so positioned as to lie directly beneath the apertures 40, 41, respectively, at the time the cutting operation is completed by the cooperating blades or knives.

The trays or receptacles 42, 43, may be attached to the slides 21, 22, in any suitable manner, permanently if desired, but I prefer to make a detachable connection by means of upwardly extending arms 44, 45, fixed to the trays and having angularly shaped heads 46, 47, adapted to be inserted into correspondingly shaped sockets 50, 51, respectively.

The blades or knives 30, 32, and 31, 33, are positioned to lie, when in normal inoperative position, at or near the opposite edges of the open ends 60, 61, respectively, of the butter tubes or holders 62, 63, which are supported in upright position in container 4. The tubes or holders 62, 63, are open at their upper ends to receive butter sticks, bars or blocks to be cut and dispensed, and are preferably spaced from the walls of the container to permit ice or other refrigerant, or suitable refrigerating coils of known character to be introduced into the container to maintain the butter in cool and firm condition.

The tubes 62, 63, may be braced, if desired, by bars 64, 65, welded or detachably secured in any suitable manner to the walls of the container and to the tubes.

For refrigerant or cooling purposes the walls of the cabinet 1 may be heat-insulated, being preferably of the double-walled type with heat-insulating material such as asbestos, balsam wood, wood fiber, or other suitable substance 70 in the spaces between the walls 71, 72, at the front, rear and side, in wall 74 at the bottom of the cabinet, and lining the cover 10.

The butter container 4 is guided and held in its proper position relative to the cutter knives or blades 31, 33, and 32, 34, by flanges 80, 81, on the tubes 62, 63, surrounding the open ends 60, 61, of the butter tubes and projecting closely into openings in the bottom 74.

The butter container 4 is provided with an overflow pipe 82 adapted to be screwed into an opening through the bottom of the container, this opening being connected in any suitable manner with a discharge pipe leading outside the cabinet and acting as a drain when the pipe 82 is removed.

When plate 20 is in position a pin 86, 87, fixed to a bar 88, 89, rigidly secured to slides 21, 22, respectively, is engaged by the bifurcated end 90 of a bell-crank lever 91, 92, pivotally mounted on pins 93, 94, respectively, in the side walls of the cabinet and projecting through slots 95, 96, in the front wall, the outer ends of the levers being provided with knobs 97, 98, for manual operation of the cutting and dispensing means, and normally held up by springs 102, 103.

In the operation of the invention, when a stick or bar of butter is inserted in tube 62 and the knob 97 is pushed downwardly, the lower end of lever 91 is tilted rearwardly and carries with it the slide 21, the blade or knife 32 of which enters the bar of butter resting on slide 21; and the blade 32, in cooperation with blade 30, cuts through the butter, severing a slice or piece, which slides over and through opening 40 and drops onto tray 42, or preferably upon a plate thereon.

The openings 100, 101, in the blades 32, 33, prevent sticking of the butter beneath the blade.

The butter in the tubes or holders 62, 63, feeds downwardly by gravity, and, when exhausted, may be replenished by a bar or stick B taken from one of the trays or receptacles 7, 8, 9.

As shown, all of the parts may be readily removed from the cabinet for cleaning, which makes for improved sanitary conditions and insures cleanliness of the butter dispensed. Cleanliness is promoted and assured by so mounting the slicing mechanism that it operates without coating and fouling of the bottom of the butter chamber and the fixed and movable blades with butter. As best shown in Fig. 6, all parts of the slicing mechanism are out of contact with the bottom of butter chamber 3, being supported on plate 20 a substantial distance below and entirely free of wall 74 and spaced a substantial distance therefrom, and contained in and protected by a substantially enclosed slicing chamber 3a below the butter chamber 3. The slicing means operates freely in the enclosed slicing chamber and may be entirely removed for cleaning by detaching plate 20.

I claim:

1. A device of the character described, comprising a vertically disposed support for butter, open at its upper end to receive the butter to be dispensed and at its lower end to present the butter to cutting and dispensing means, and cutting and dispensing means including a plate positioned beneath said support and having an aperture therein, a slide reciprocably mounted on said plate, said slide having an opening in substantial alignment with the bottom opening of said support and said plate aperture, a fixed horizontal cutting blade on said plate, a horizontal cutting blade carried by said slide and movable therewith into cooperative relation with said fixed blade, and a butter receptacle supported on said slide beneath said plate aperture, said cutting and dispensing means being spaced from and out of contact with said butter support.

2. A unitary butter cutting and dispensing mechanism for a sanitary butter dispenser comprising a plate, guides on said plate, a fixed blade supported on said plate in offset parallel relation thereto, a slide reciprocably mounted on said plate between said guides, and a blade mounted on and reciprocating with said slide into engagement with said fixed blade, said plate and said slide having apertures therein which are in registry when said blades are in engagement, and said fixed blade having an opening therein to prevent sticking of the butter beneath said blade.

3. A device of the character described comprising a casing having walls defining a butter chamber and a slicing chamber therebeneath, the bottom wall of said butter chamber having an aperture for the discharge of butter to be cut, slicing mechanism, and a plate removably secured to said casing at the bottom of said slicing chamber, said plate supporting said slicing mechanism a substantial distance beneath and out of contact with the bottom wall of said butter chamber.

4. A device of the character described comprising a casing having a butter chamber and a slicing chamber beneath the bottom wall of said butter chamber, said bottom wall having an aperture for the discharge of butter to be cut, slicing mechanism comprising cooperating fixed and slidable cutting blades, and a removable plate closing said slicing chamber and supporting all of the parts of said slicing mechanism out of contact with and a substantial distance below the bottom wall of said butter chamber.

5. A device of the character described, comprising a casing having walls defining a butter chamber and a slicing chamber therebeneath, the bottom wall of said butter chamber having an opening therein, a removable bottom plate substantially closing said slicing chamber, a slide reciprocably mounted on said plate, a fixed cutting blade on said plate in substantial alignment with the opening in the bottom of said butter chamber, a cutting blade mounted upon and slidable with said slide into engagement with said fixed blade, said plate and said slide having apertures for discharge of butter therethrough, and a butter receptacle supported on said slide and adapted to receive butter cut by said blades as it drops through said apertures when said apertures are in registry upon completion of the cutting operation, said plate and all of the parts of said slicing means being located a substantial distance below and out of contact with the bottom wall of said butter chamber.

6. A device of the character described comprising a casing having a butter chamber and a slicing chamber therebeneath, said butter chamber having an opening in its bottom, an open-ended support for butter within said butter chamber and vertically disposed above the opening in said bottom wall, a plate removably secured upon and substantially closing the bottom of said casing, and slicing means supported by said plate within said slicing chamber a substantial distance below and entirely free of said bottom wall, said slicing means comprising a slide reciprocably mounted on said plate and having an aperture therein and a cutting blade thereon, the butter in said support normally being supported on said slide and butter cut from the butter thus supported dropping through the apertures in said plate and slide when said apertures are brought into registry upon the completion of the cutting operation.

7. A device of the character described comprising a casing having walls defining a butter chamber and a slicing chamber below said butter chamber, the bottom wall of said butter chamber having an opening for the discharge of butter to be cut, a removable plate substantially closing the bottom of said slicing chamber, slicing means supported on said plate, said means comprising a fixed blade on said plate in offset parallel relation thereto, a slide reciprocably mounted on said plate, a blade mounted on and reciprocating with said slide into engagement with said fixed blade, and means for reciprocating said slide, said plate and said slide having apertures therein which are in registry when said blades are in engagement, and said plate removably supporting said fixed blade and said reciprocating blade out of contact with and a substantial distance below the bottom of said butter chamber.

8. A device of the character described comprising a butter-holding tube open at its bottom, a plate disposed beneath the open end of said tube and spaced a substantial distance therefrom, a fixed cutting blade on said plate, and a blade reciprocably mounted on said plate and movable into cutting engagement with said fixed blade, said blades being disposed beneath the open end of said tube and out of contact therewith.

LOUIS H. REZOS.